US012793352B2

(12) United States Patent
Nattinger et al.

(10) Patent No.: US 12,793,352 B2
(45) Date of Patent: Nov. 10, 2026

(54) MULTILAYER HANDLING TECHNIQUES FOR DISPLAYING CONTENT IN HEAD-MOUNTED DISPLAY DEVICES

(71) Applicant: Apple Inc., Cupertino, CA (US)

(72) Inventors: Elena J Nattinger, Menlo Park, CA (US); Devin W Chalmers, Oakland, CA (US); Anna L Brewer, Santa Barbara, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 18/889,252

(22) Filed: Sep. 18, 2024

(65) Prior Publication Data

US 2025/0111614 A1 Apr. 3, 2025

Related U.S. Application Data

(60) Provisional application No. 63/541,282, filed on Sep. 28, 2023.

(51) Int. Cl.
*G06T 19/00* (2011.01)
*G02B 27/00* (2006.01)
*G02B 27/01* (2006.01)

(52) U.S. Cl.
CPC ........ *G06T 19/003* (2013.01); *G02B 27/0093* (2013.01); *G02B 27/017* (2013.01)

(58) Field of Classification Search
CPC .............. G06T 19/003; G02B 27/0093; G02B 27/017; G02B 2027/014; G02B 2027/0187; G06F 3/012; G06F 3/1454
See application file for complete search history.

(56) References Cited

U.S. PATENT DOCUMENTS

| | | | | |
|---|---|---|---|---|
| 5,742,264 A * | 4/1998 | Inagaki | .................. | G09G 5/397 348/E5.145 |
| 10,048,751 B2 | 8/2018 | Jaafar et al. | | |
| 2006/0233105 A1 | 10/2006 | Rapp | | |

(Continued)

FOREIGN PATENT DOCUMENTS

| | | |
|---|---|---|
| WO | WO 2020/106340 | 5/2020 |
| WO | WO 2023/009864 | 7/2022 |

OTHER PUBLICATIONS

Aguilar et al., "Evaluation of a gaze-controlled vision enhancement system for reading in visually impaired people", PLoS One, vol. 12, No. 4, Article No. e0174910, Apr. 5, 2017, pp. 1-24.

(Continued)

*Primary Examiner* — Jeffery A Brier
(74) *Attorney, Agent, or Firm* — Brownstein Hyatt Farber Schreck, LLP

(57) ABSTRACT

Various multilayer handling techniques for head-mounted display devices may smooth motion of a viewing area that results from head movement, may restrict the viewing area to a defined display boundary, and may variously apply different motion criteria to the content and the viewing area of the head-mounted display devices. This may shift the content and the viewing area of the head-mounted display devices differently, which may in turn cause the content presentation to appear less shaky than if the content were fully head-locked, resulting in a more pleasant and usable viewing experience.

20 Claims, 14 Drawing Sheets

(56) References Cited

U.S. PATENT DOCUMENTS

| | | | | |
|---|---|---|---|---|
| 2015/0156803 | A1* | 6/2015 | Ballard | H04N 23/635 455/422.1 |
| 2016/0154242 | A1* | 6/2016 | Border | G02B 27/0149 345/8 |
| 2018/0075820 | A1* | 3/2018 | Hicks | G06F 3/14 |
| 2018/0307303 | A1 | 10/2018 | Powderly et al. | |
| 2018/0321742 | A1 | 11/2018 | Khalid et al. | |
| 2019/0025588 | A1* | 1/2019 | Osterhout | H04N 9/312 |
| 2020/0036962 | A1* | 1/2020 | Grinberg | G02B 1/118 |
| 2020/0357183 | A1 | 11/2020 | Weber | |
| 2021/0257084 | A1 | 8/2021 | Freeman et al. | |
| 2021/0294413 | A1 | 9/2021 | Manduchi | |
| 2022/0066221 | A1 | 3/2022 | Yoon et al. | |
| 2022/0214743 | A1* | 7/2022 | Dascola | G06F 3/011 |
| 2022/0309722 | A1 | 9/2022 | Hoover et al. | |
| 2022/0350693 | A1 | 11/2022 | Breugelmans | |
| 2023/0008009 | A1* | 1/2023 | Nicholson | G06F 3/011 |
| 2025/0111471 | A1 | 4/2025 | Nattinger et al. | |
| 2025/0111614 | A1 | 4/2025 | Nattinger et al. | |

OTHER PUBLICATIONS

Ashmore et al., “Efficient eye pointing with a fisheye lens”, Proceedings of Graphics Interface, May 7, 2005, pp. 203-210.

Choi et al., “Kuiper Belt: Utilizing the “Out-of-natural Angle” Region in the Eye-gaze Interaction for Virtual Reality”, Proceedings of the 2022 CHI Conference on Human Factors in Computing Systems, Apr. 29-May 5, 2022, 18 pages.

Mohan et al., “DualGaze: Addressing the Midas Touch Problem in Gaze Mediated VR Interaction”, IEEE International Symposium on Mixed and Augmented Reality Adjunct (ISMAR-Adjunct), 2018, pp. 79-84.

Sato et al., “GazeScope: Gaze Target Selection with a Magnifier in VR Environments”, Proceedings of the Augmented Humans International Conference 2025, Mar. 16-20, 2025, pp. 65-78.

* cited by examiner

MULTILAYER HANDLING TECHNIQUES FOR DISPLAYING CONTENT IN HEAD-MOUNTED DISPLAY DEVICES

CROSS-REFERENCE TO RELATED APPLICATIONS

This application claims the benefit under 35 U.S.C. § 119(e) of U.S. Provisional Patent Application No. 63/541,282, filed Sep. 28, 2023, the contents of which are incorporated herein by reference as if fully disclosed herein.

FIELD

The described embodiments relate generally to head-mounted display devices. More particularly, the present embodiments relate to multilayer handling techniques for displaying content in head-mounted display devices.

BACKGROUND

Head-mounted display devices involve apparatuses with display devices, such as glasses with liquid crystal and/or other display devices, which may be mounted to a user's head. Head-mounted display devices may be used for various applications, such as virtual reality or mixed reality. In some devices, the display device portions of head-mounted displays may be opaque such that the user does not see the surrounding physical environment through content presented by the head-mounted display. In other devices, the display device portions of head-mounted display devices may be at least partially transparent such that the user does sees the surrounding physical environment through content presented by the head-mounted display. Head-mounted display devices may be used to present an extended reality environment, which may allow a user to view virtual content, which in some instances may be displayed alongside aspects of their physical environment.

SUMMARY

The present disclosure relates to multilayer handling techniques for head-mounted display devices. The disclosed multilayer handling techniques may smooth motion of a viewing area that results from head movement, restrict the viewing area to define a display boundary, and variously apply different motion criteria to the content and the viewing area of the head-mounted display devices, shifting the content and the viewing area of the head-mounted display devices differently. This may cause the content presentation to appear less shaky than if the content were fully head-locked, resulting in a more pleasant and usable viewing experience.

In various embodiments, a system includes a head-mounted display device having a field of view, a display boundary within the field of view, and a viewing area defined within the display boundary; at least one non-transitory storage medium that stores instructions; and at least one processor. The at least one processor executes the instructions to display a portion of content in the viewing area, apply at least one first motion criteria to shift the viewing area a first amount with respect to the field of view responsive to a detected head movement, apply at least one second motion criteria responsive to the detected head movement to shift the content a second amount with respect to the field of view different from the first amount, and return the viewing area to an initial position within the display boundary.

In some examples, the viewing area shifts with respect to the field of view during a first time period and with respect to an extended reality environment associated with the head-mounted display device during a second time period. In a number of examples, the second amount is proportional to an amount of the detected head movement.

In various examples, the second amount is at least one of proportionally less than an amount of the detected head movement or proportionally greater than the amount of the detected head movement. In some implementations of such examples, the second amount includes a first portion that the content shifts prior to slowing of the detected head movement and a second portion that the content shifts upon slowing of the head movement and the first portion and the second portion are unequal. In a number of implementations of such examples the second portion proportionally equals a corresponding portion of the detected head movement. In some implementations of such examples, the at least one processor further executes the instructions to return the content to an original position within the viewing area.

In a number of examples, the at least one processor further executes the instructions to at least one of slow shifting of the content as the viewing area approaches a content boundary or cease the shifting of the content upon the viewing area reaching the content boundary. In some examples, at least one of shifting of the viewing area or shifting of the content continues after cessation of the detected head movement. In a number of examples, the initial position of the viewing area is centered within the display boundary.

In various examples, the display boundary is a physical boundary of a display of the head-mounted display device. In some examples, at least one of the viewing area, the display boundary, the content, or the field of view are at least partially transparent.

In some embodiments, a system includes at least one non-transitory storage medium that stores instructions and at least one processor. The at least one processor executes the instructions to display a portion of content in a viewing area defined within a display boundary in a field of view of a head-mounted display device, shift the viewing area with respect to the field of view responsive to a detected head movement before returning the viewing area to an initial position within the display boundary, and shift the content displayed in the viewing area with respect to the field of view responsive to the detected head movement differently than the viewing area is shifted.

In various examples, the at least one processor further executes the instructions to return the viewing area to an original position within the display boundary upon slowing of the detected head movement. In a number of examples, the at least one processor executes the instructions to shift at least one of the viewing area of the content in a direction opposite the detected head movement. In some examples, the content is a menu.

In a number of embodiments, a system includes at least one non-transitory storage medium that stores instructions and at least one processor. The at least one processor executes the instructions to display a portion of content in a viewing area defined within a display boundary in a field of view of a head-mounted display device, shift the viewing area with respect to the field of view according to a first motion criteria responsive to a detected head movement during a first time period prior to the viewing area reaching a display boundary edge, shift the viewing area with respect to an extended reality environment associated with the content according to a second motion criteria responsive the detected head movement during a second time period after the viewing area reaches the display boundary edge, shift the content displayed in the viewing area with respect to the field of view according to a third motion criteria responsive to the detected head movement, and return the viewing area to an initial position within the display boundary.

In various examples, the at least one processor further executes the instructions to pan the viewing area as the viewing area returns to the initial position. In some implementations of such examples, panning of the viewing area is at a different speed than that of the detected head movement.

In a number of examples, the content shifts instead of the viewing area panning as the viewing area returns to the initial position.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
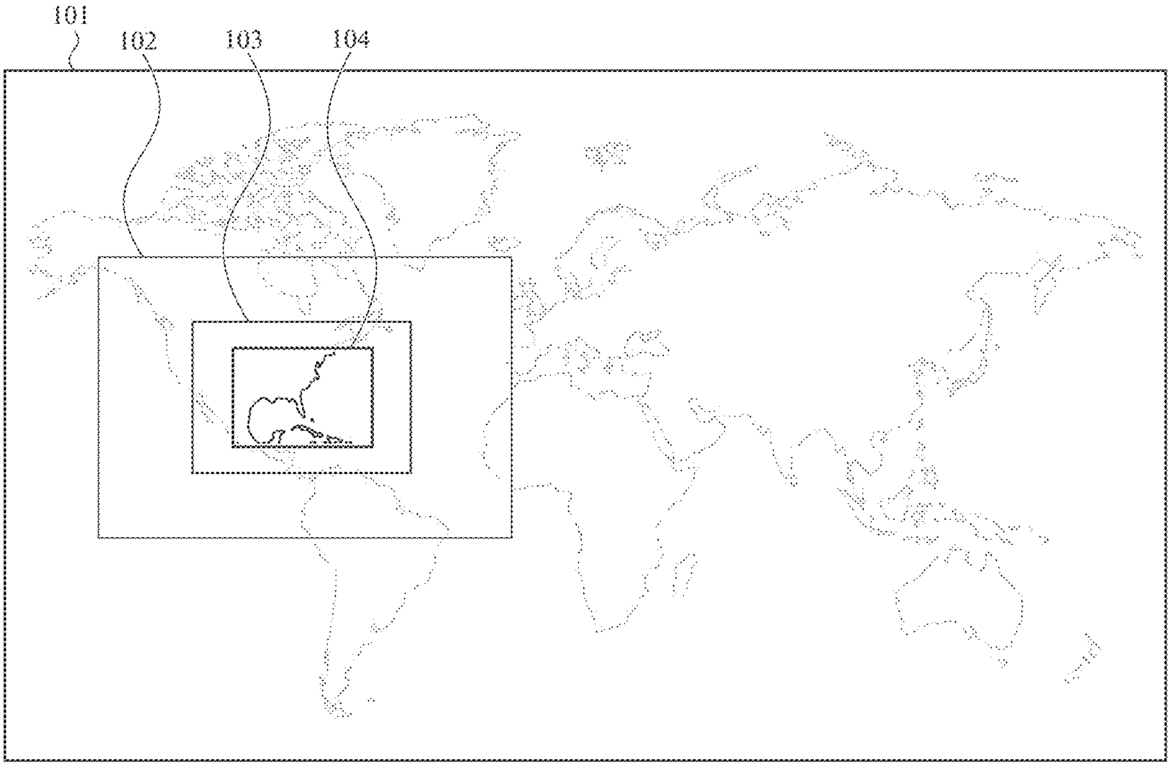
FIG. 1 illustrates content that may be presented within the viewing area of the field of view of a head-mounted display device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The present disclosure relates to defining and presenting, in an extended reality environment, a viewing area and content within the viewing area, and applying different motion criteria to the viewing area and the underlying content to control their relative positioning as the user moves their head.

The devices and methods described herein may be utilized as part of a head-mounted display device in which an extended reality environment is generated and displayed to a user by a head-mounted display device. Various terms are used herein to describe the various head-mounted display devices and associated extended reality environments described herein. For example, as used herein, a "physical environment" is a portion of the real world around a user that the user may perceive and interact with without the aid of the head-mounted display devices described herein. For example, a physical environment may include a room of a building or an outdoor space, as well as any people, animals, or objects (collectively referred to herein as "real-world objects") in that space, such as plants, furniture, books, or the like.

As used herein, an "extended reality environment" refers to a wholly or partially simulated environment that a user may perceive and/or interact with using a head-mounted display device as described herein. In some instances, an extended reality environment may be a virtual reality environment, which refers to a wholly simulated environment in which the user's physical environment is completely replaced with virtual content within the virtual reality environment. The virtual reality environment may not be dependent on the user's physical environment, and thus may allow the user to perceive that they are in a different, simulated location (e.g., standing at a beach when they are actually standing in a room of a building). The virtual reality environment may include virtual objects (e.g., simulated objects that may be perceived by the user but are not actually present in the physical environment) with which the user may interact.

In other instances, an extended reality environment may be a mixed reality environment, a wholly or partially simulated environment in which a user may view virtual content along with a portion of a user's physical environment. Specifically, a mixed reality environment (which may include augment reality environments) may allow a user to perceive aspects of their physical environment, either directly or indirectly. In this way, the user may be able to perceive (directly or indirectly) their physical environment through the mixed reality environment while also still perceiving the virtual content.

Accordingly, when an extended reality environment is described herein as including a portion of a user's physical environment, the portion of user's physical environment may be viewed by the user using direct visualization, an indirect reproduction, or a modified representation. For example, a direct visualization may occur in instances the head-mounted display device may have a transparent or translucent display. In these instances, the head-mounted display device may be configured to present virtual content on the transparent or translucent display (or displays) to create the extended reality environment. In these embodiments, the user may directly view, through the transparent or translucent display (or displays), portions of the physical environment that are not obscured by the presented virtual content.

In an indirect reproduction, one or more images corresponding to the user's physical environment may be displayed on a display of the head-mounted display device. In these embodiments, the head-mounted display device may include one or more cameras that are able to capture images of the physical environment. When a portion of these images are displayed, a user may be able to indirectly view a corresponding portion of their physical environment via the displayed images. This may be beneficial in instances where the head-mounted display device includes an opaque display (or displays), such that a user is unable to directly view the physical environment through the display. It should be appreciated, however, that an indirect reproduction may be displayed on a transparent or translucent display. Images captured of the physical environment that are used to generate indirect reproductions may undergo standard image processing operations such as tone mapping, color balancing, image sharpening, in an effort to match the indirect reproduction to the physical environment. Additionally, in some instances the extended reality environment is displayed using foveated rendering, in which different portions of the extended reality environment are rendered using different levels of fidelity (e.g., image resolution) depending on a direction of a user's gaze. In these instances, portions of a reproduction that are rendered at lower fidelity using these foveated rendering techniques are still considered reproductions for the purposes of this application.

As used herein, a "modified representation" of a portion of a physical environment refers to a portion of an extended reality environment that is derived from the physical environment, but intentionally obscures one or more aspects of the physical environment. Whereas an indirect reproduction attempts to replicate a portion the user's physical environment within the extended reality environment, a modified representation intentionally alters one or more visual aspects of a portion of the user's physical environment (e.g., using one or more visual effects such an artificial blur). In this way, a modified representation of a portion of a user's physical environment may allow a user to perceive certain aspects of that portion of the physical environment while obscuring other aspects. In the example of an artificial blur, a user may still be able to perceive the general shape and placement of real-world objects within the modified representation, but may not be able perceive the visual details of these objects that would otherwise be visible in the physical environment. In instances where the extended reality environment is displayed using foveated rendering, portions of a modified representation that are in peripheral regions of the extended reality environment (relative to the user's gaze) may be rendered at lower fidelity using foveated rendering techniques. Overall, the techniques described herein may be applicable to a variety of different head-mounted display devices as well as different extended reality environments displayed by these devices.

As used herein, virtual content displayed on a display as part of an extended reality environment may be "head-locked" such that it has a fixed relationship to a user's field of view. Specifically, when a portion of an extended reality environment is presented on a display of a head-mounted display device, head-locked virtual content will be presented at the same location of the display regardless of how the head-mounted display device moves. To maintain this fixed position relative to the user's field of view, the relative position of the virtual content within an extended reality environment changes with head movement (translational or rotational).

By way of contrast, "body-locked" virtual content, as used herein, has a position within an extended reality environment that is fixed relative to the position (but not the orientation) of the head-mounted display. The body-locked content moves within the extended reality environment with translational movement of the head-mounted display device, but not with rotational movement (e.g., in one or more directions) of the head-mounted display device. As the user moves their head, body-locked content may be presented at different locations on a display of the head-mounted display device. The body-locked content will always appear to be the same distances away from the user within the extended reality environment. In some instances, body-locked content remains fixed in the extended reality environment regardless of the direction of rotation (e.g., it is fixed as the head-mounted display device rotates around any of the pitch, yaw, and roll axes). In other variations, the body-locked content remains fixed in the extended reality environment for certain rotational directions (e.g., rotation around pitch or yaw axes), but not for other rotational directions (e.g., rotation around a roll axis).

"World-locked" virtual content, as used herein, has a fixed location within an extended reality environment, and remains in that position regardless of translational and rotational movement of the head-mounted display device. Accordingly, the presentation of world-locked content on a display may change (in location and/or size) as a user moves and looks around.

Head-mounted display devices may, depending on the virtual content, present content that is head-locked, body-locked, or world-locked. For example, in some instances it may be desirable to present virtual content in a portion of an extended reality environment. In these instances, a viewing area may be positioned in the extended reality environment, and virtual content may be displayed in the viewing area. Specifically, the viewing area defines a boundary within which a user may view the content. The viewing area may be smaller than a field of view of a head-mounted display device, such that a user may be able to see other content outside of the viewing area (e.g., a virtual environment or a portion of the user's physical environment).

Under different circumstances, the content presented within a viewing area may be head-locked, body-locked, or world-locked. Head-locking content may be useful when it is desirable to show the same region/portion of a certain content, regardless of the user's head position. Conversely, body-locking or world-locking content may be useful when the content is larger than the viewing, which may allow the user to view other portions of the content.

In some examples, a head-mounted display device may use a viewing area to present a real-time camera stream (e.g., a live preview associated with image/video capture), which may be presented on a display of the head-mounted display device as part of a media capture event. Specifically, a set of cameras may be used to capture images during one or more photography modes (e.g., a photo mode that can capture still images, a video mode that may capture videos, a panoramic mode that can capture a panoramic photo, a portrait mode that can capture a still photo having an artificial bokeh applied, or the like). In general, during these modes, a head-mounted display device may display (e.g., via a set of displays) a camera user interface that displays a "live preview." The live preview may be a stream of images captured by the set of cameras and presented in real-time, and the portion of the image stream that is displayed in the viewing area (which may show a subset of each of the images captured by the set of cameras) may represent a field of view that may be captured when the camera initiates a media capture event. In other words, the live preview allows a user to see what portion of the scene is currently being imaged and to decide when to capture a photo or video.

In these instances (especially when the preview stream is presented on transparent or translucent display), it may be desirable for the presented image data (e.g., content) to overlap the corresponding portion of the user's physical environment. In this way, the portion of an image presented in a viewing area may correspond to the portion of the physical environment that was captured in the image. Because the cameras move with the head-mounted display device, it may be desirable to head-lock the image stream so that the position of the image stream moves within the extended reality environment to stay aligned with the portion of the physical environment captured by the cameras. Similarly, the viewing area may be head-locked, such that live preview is always presented at the same portion of a user's field of view.

However, head-locking the viewing area and/or the presented content may make the content presentation appear shaky to the user. Excessive content motion may make it difficult for the user to register the content that the user is looking at, particularly when the content includes text that the user may read. This may result in a less pleasant viewing experience, but may also cause the user to move their head more in an attempt to register the content that the user is looking at, which may cause the head-mounted display device to expend more software, hardware, and/or power resources to monitor the user's movement, render the updated viewing area, and so on. The user may also have to look longer to register the content the user is looking at, also causing the head-mounted display device to expend more software, hardware, and/or power resources.

The present disclosure provides technical solutions to these technical problems by separately handling, in response to rotational movement of a head-mounted display device, movement of a viewing area in an extended reality environment and movement of the presented content relative to the viewing area. These multilayer handling techniques may smooth motion of a viewing area that results from head movement, restrict the viewing area to a defined display boundary, and variously apply different motion criteria to the content and the viewing area of the head-mounted display devices, shifting the content and the viewing area of the head-mounted display devices differently. This may cause the content presentation to appear less shaky than if the content were fully head-locked, resulting in a more pleasant and usable viewing experience.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates content 101 that may be presented within a viewing area 104 of a field of view 102 of a head-mounted display device. The content 101 may be virtual content that is displayed in the field of view 102 as part of an extended reality environment. The viewing area 104 may represent a portion of the field of view 102 that displays content 101, and the relative position between the viewing area 104 and the content 101 within the extended reality environment may control what portion of the content 101 is presented to the user. In this way, movement of the viewing area 104 within the field of view 102 changes where content 101 will be displayed on display of the head-mounted display device, while relative movement between the viewing area 104 and the content 101 changes what portion of the content 101 is displayed. As shown, the content 101 may be larger than the viewing area 104, such that only a portion of the content 101 is visible to the user at a given moment.

The content 101 is shown in this example as a map (the portions of which that are outside of the viewing area 104 represent the portions of the content that is not actively being displayed). However, it is understood that this is an example. Further, in other examples the content 101 may be any kind of content, such as a menu or other user interface, a photo wall, an image stream (e.g., a live camera feed, such as a live preview as discussed herein), and so on. Similarly, the content 101 may be static such that the content 101 does not change over time, or may be dynamic such that the content 101 is updated over time. For example, a single image may be considered static content, whereas a video or image stream may be considered dynamic content. Various configurations are possible and contemplated without departing from the scope of the present disclosure.

As the head-mounted display device is rotated, the viewing area 104 and the content 101 may each be moved relative to the field of view 102, which may impact how the content 101 is viewed (both where it is presented within the field of view 102 as well as what portion of the content 101 is visible). Specifically, the viewing area 104 may move relative to the field of view 102 according to a first set of motion criteria, and the content 101 may move relative to the field of view 102 according to a different second set of motion criteria. Accordingly, as the head-mounted display device is rotated the first set of motion criteria will control how the viewing area 104 is moved and the second set of motion criteria will control how the content 101 is moved.

For example, in some variations it may be desirable to partially head-lock the viewing area 104. In these instances, the viewing area 104 may be move within the field of view 102 while the head-mounted display device is moving, but will return to its original position when the head-mounted display device stops moving. Movement of the viewing area 104 (e.g., and thereby its position within the extended reality environment) may lag behind that of the user's head, which may act to smooth the motion of the viewing area 104.

Specifically, the viewing area 104 has a default position within the field of view 102. When the viewing area 104 is head-locked, the viewing area 104 will remain at the default position regardless of how the head-mounted display device is moved. When the viewing area 104 is partially head-locked, the viewing area 104 will move from the default position as a result of detected motion of the head-mounted display device. At each point in time, a new position may be determined for the viewing area 104 that is somewhere between the default position and a position corresponding to the previous position if the viewing area 104 were to be world-locked.

For example, the head-mounted display device may determine a lag value based on detected device motion. This lag value determines how much the viewing area will deviate from the default position at a given time. For example, at any given time the lag value may have a value that ranges between a minimum value (e.g., 0) that represents a head-locked behavior and a maximum value (e.g., 1) that represents word-locked behavior. It should be appreciated that in other variations, the lag value may be limited to values below the maximum value, such that the viewing area does not achieve world-locked behavior.

The head-mounted display device will use the lag value to calculate a target coordinate in the extended reality environment, and will display the viewing area 104 at a position in the field of view 102 corresponding to the target coordinate. Specifically, for each frame in which the viewing area 104 is displayed, the head-mounted display device will determine a lag value based on device motion and a previous target coordinate of the viewing area from the previous frame. The head-mounted display device will apply the determined lag value to the previous target coordinate to calculate the target coordinate for the current frame.

Figure 3A:
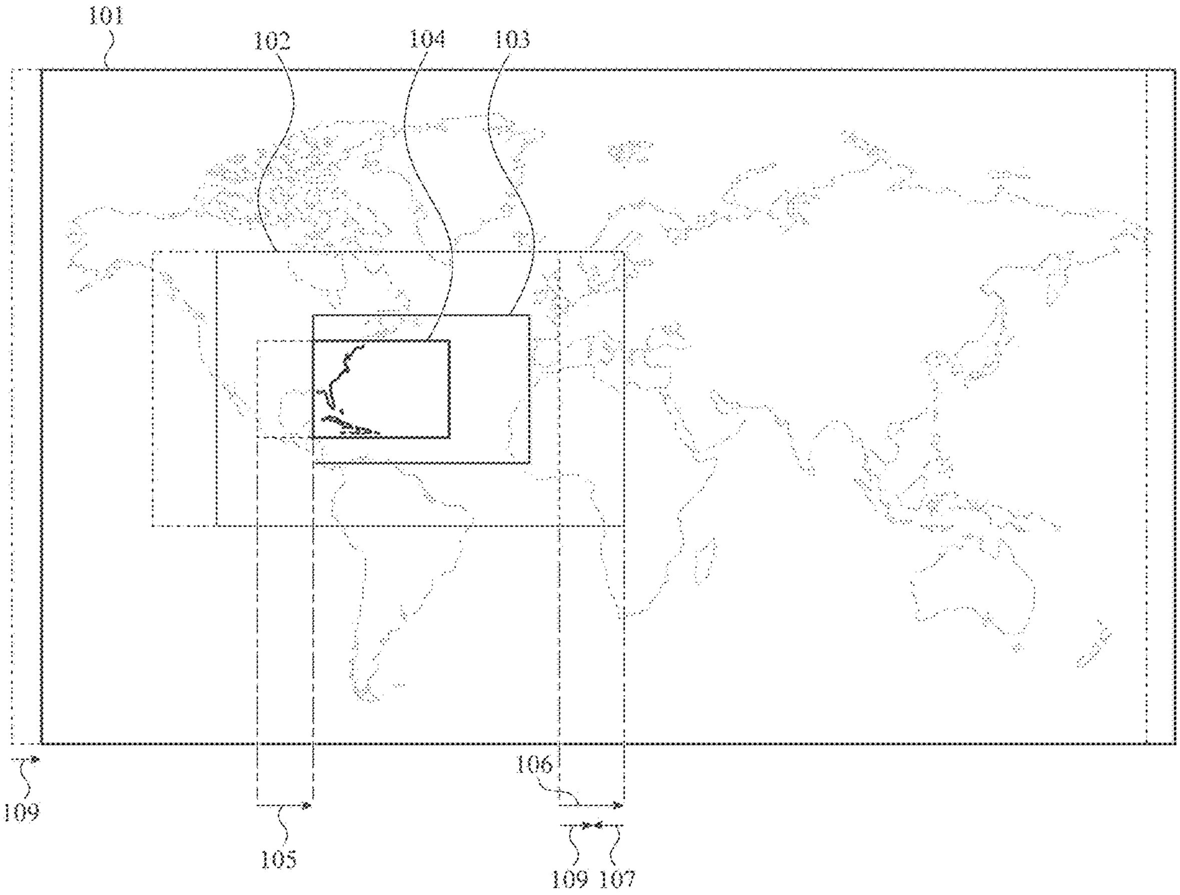
FIG. 3A illustrates first movement of the content and the viewing area of FIG. 1 according to second different motion criteria.

When the calculated lag value is the minimum value, the calculated target coordinate will correspond to the default position. In these instances, the viewing area 104 will be head-locked and will remain at the same position within the field of view 102, even as the head-mounted display device moves. Conversely, when the calculated lag value is the maximum value, the calculated target coordinate may correspond to the previous target coordinate. In these instances, the viewing area 104 will appear to remain fixed within the extended reality environment, but will move to a different position within the field of view 102 (such as is shown in FIG. 3A). Accordingly, for each frame, the viewing area 104 will be positioned in the field of view 102 somewhere between the default position and a position corresponding to the previous target coordinate.

The calculated lag value may depend on one or more characteristics of the determined device movement. In some variations, there may be a relationship between the detected movement speed and the lag value. For example, for detected motion under a first threshold speed, the lag value may be the minimum value. In other words, if a user moves their head sufficiently slowly, the viewing area 104 may remain head-locked. If the detected motion is greater than a second threshold speed, the lag value may be the maximum value and the viewing area 104 may be world-locked. Between the first and second threshold speeds, there may be predetermined relationship (e.g., a linear relationship, and exponential relationship, or the like) between the determined speed and the lag value. Accordingly, the viewing area 104 may be partially head-locked.

Depending on how the partial head-locking is configured, there may be instances in which it is difficult to confine the content 101 to a certain portion of the field of view 102. If the viewing area 104 lags too far behind the user, it may either reach the limits of the display capabilities of the device or fall so far behind the user's gaze as to no longer be readily visible to the user. Accordingly, in some variations the head-mounted display device may include a display boundary 103 that is defined within the field of view 102. In some variations, the partial head-locking may be configured such that the viewing area 104 remains within the display boundary 103. In some examples, the display boundary 103 may be a physical boundary of a display outside of which the head-mounted display device is unable to display the content 101. In other examples, the field of view 102 may be capable of displaying the content 101 outside of the display boundary 103, but may be configured not to do so.

Accordingly, in some variations the target coordinate may be bounded based on the display boundary 103. Specifically, the calculated target coordinate may be normalized such that the viewing area remains within the display boundary 103. In other words, even if the determined motion is sufficient to treat the viewing area 104 as word-locked, the device will not select a target coordinate that would cause the viewing area 104 to fall outside of the display boundary 103. In these instances, the viewing area 104 may be locked relative to the display boundary until the device motion has sufficiently slowed down to allow the viewing area 104 to move closer to the default position.

Figure 2A:
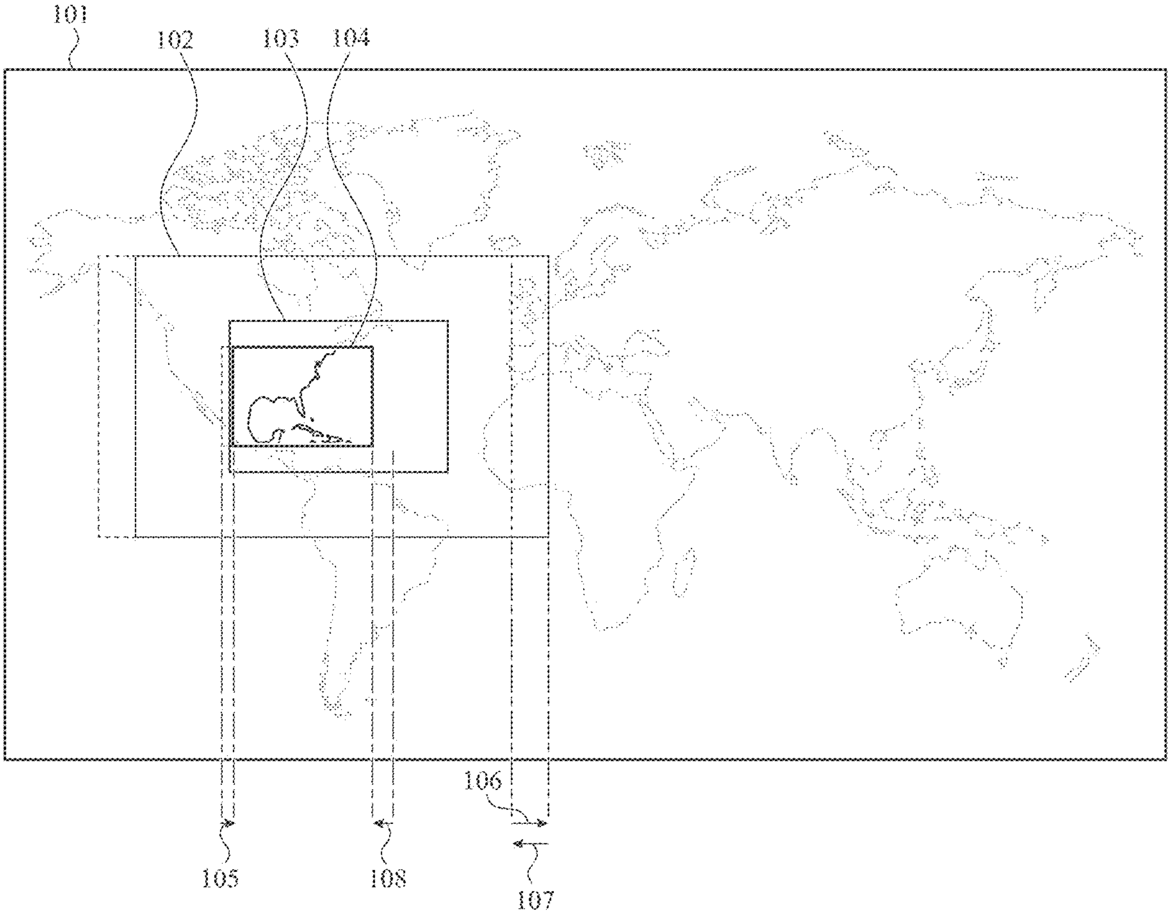
FIG. 2A illustrates first movement of the content and the viewing area of FIG. 1 according to first different motion criteria.

Different motion criteria may specify different ways that the viewing area 104 and the content 101 move under different circumstances. FIG. 2A shows an instance during a first time period in which the viewing area 104 and the content 101 are moved relative to the field of view 102 and the viewing area 104 is moved relative to an extended reality environment according to a first different motion criteria. Specifically, a first motion criteria is applied to the viewing area 104 such that the viewing area 104 is partially head-locked, and a second motion criteria is applied to the content 101 such that the content 101 is body-locked. In the variation shown in FIG. 2B, the viewing area 104 may be boundary locked and thus during a second time period the viewing area 104 may not move with respect to the field of view 102.

Figure 2B:
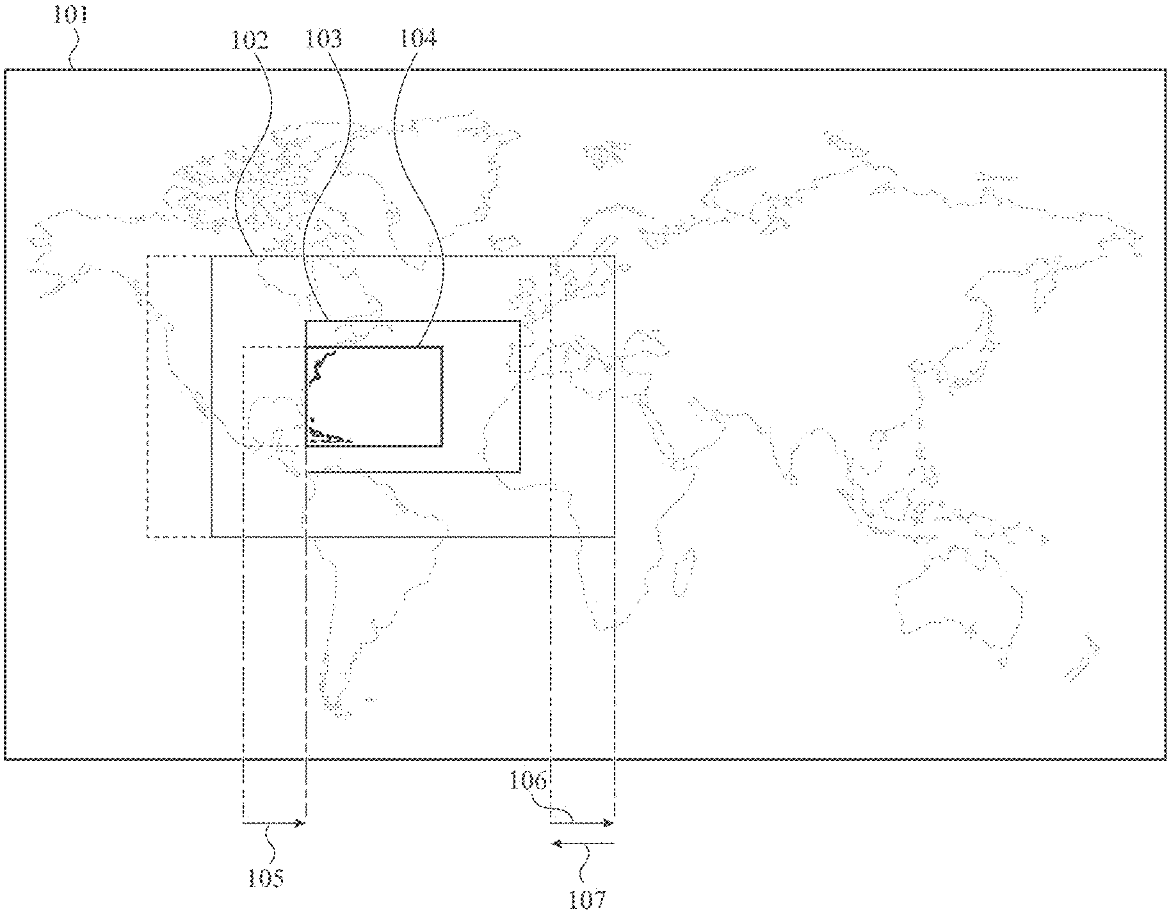
FIG. 2B illustrates second movement of the content and the viewing area of FIG. 2A according to the first different motion criteria.

FIG. 2A may show movement of the content 101 and the viewing area 104 during the first time period before the viewing area 104 is boundary locked, whereas FIG. 2B shows movement of the content 101 and the viewing area 104 during the second time period while the viewing area 104 is boundary locked.

FIG. 2A illustrates first movement of the content 101 and the viewing area 104 of FIG. 1 according to first different motion criteria. Specifically, the head-mounted display device may be moved (e.g., rotated) by an amount, such that movement 106 of the field of view 102 with respect to the extended reality environment is relative to amount of the user's physical environment. This may cause the head-mounted display device to view a different portion of the extended reality environment.

The content 101 and the viewing area 104 are moved relative to the field of view 102 according to a first different motion criteria. Movement 107 illustrates movement of the content 101 with respect to the field of view 102 and movement 108 illustrates movement of the viewing area 104 relative to the field of view 102. Specifically a first set of motion criteria may control movement of the viewing area 104 a first amount relative to the field of view 102 during a first time period and a second set of motion criteria may control movement of the content 101 a second amount relative to the field of view 102 during a second time period as the head-mounted display device moves. The first set of motion criteria may also control movement of the viewing area 104 relative to the extended reality environment. As the content 101 is body-locked, the content 101 second set of motion criteria may not move the content 101 relative to the extended reality environment in this example. Movement 105 illustrates movement of the viewing area 104 relative to the extended reality environment.

Because the viewing area 104 is partially head-locked, the viewing area 104 will be shifted by the first amount. The magnitude of the first amount may depend on the lag value discussed previously. For example, if the user's head motion is greater than first and/or the second threshold speed discussed above, the movement 108 of the viewing area 104 relative to the field of view 102 may lag the user head motion while the movement 107 of the content 101 relative to the field of view 102 may be a second amount relative to the user head motion to maintain a body-locked position.

It should be understood that herein where the movement 107 of the content 101 with respect to the field of view 102 and/or the movement 108 of the viewing area 104 with respect to the field of view is described as more than/less than/equal to the user head motion, it is understood that lateral translation may depend on the amount of head rotation and a distance from the user to the content 101. In other words, for a given amount of head rotation (e.g. 5 degrees, the user's head may pan across a larger range of the content 101 than if the content 101 is further away.

With respect to FIG. 2B, as discussed above, the movement of the viewing area 104 may be restricted to within the display boundary 103. Thus, according to the first different motion criteria, as user head motion is a sufficient amount at a sufficient rate, the viewing area 104 may reach an edge of the display boundary 103. As shown, when the viewing area 104 reaches the edge of the display boundary 103, according to the first different motion criteria, the viewing area 104 motion may be changed to no longer be lagged, tracking head motion. FIG. 2A may result in panning that is slower than the head motion, whereas FIG. 2B may result in panning that is equal to the head motion. In this context, the "panning" may be how the content 101 changes within the viewing area 104.

Thus, FIGS. 2A-2B show application the first different motion criteria during a first time period prior to a boundary edge and after reaching the boundary edge during a second time period such that the viewing area moves with respect to the field of view 102 (the movement 108) and the extended reality environment (the movement 105) during the first time period shown in FIG. 2A and only with respect to the extended reality environment (the movement 105) during the second time period shown in FIG. 2B.

Figure 2C:
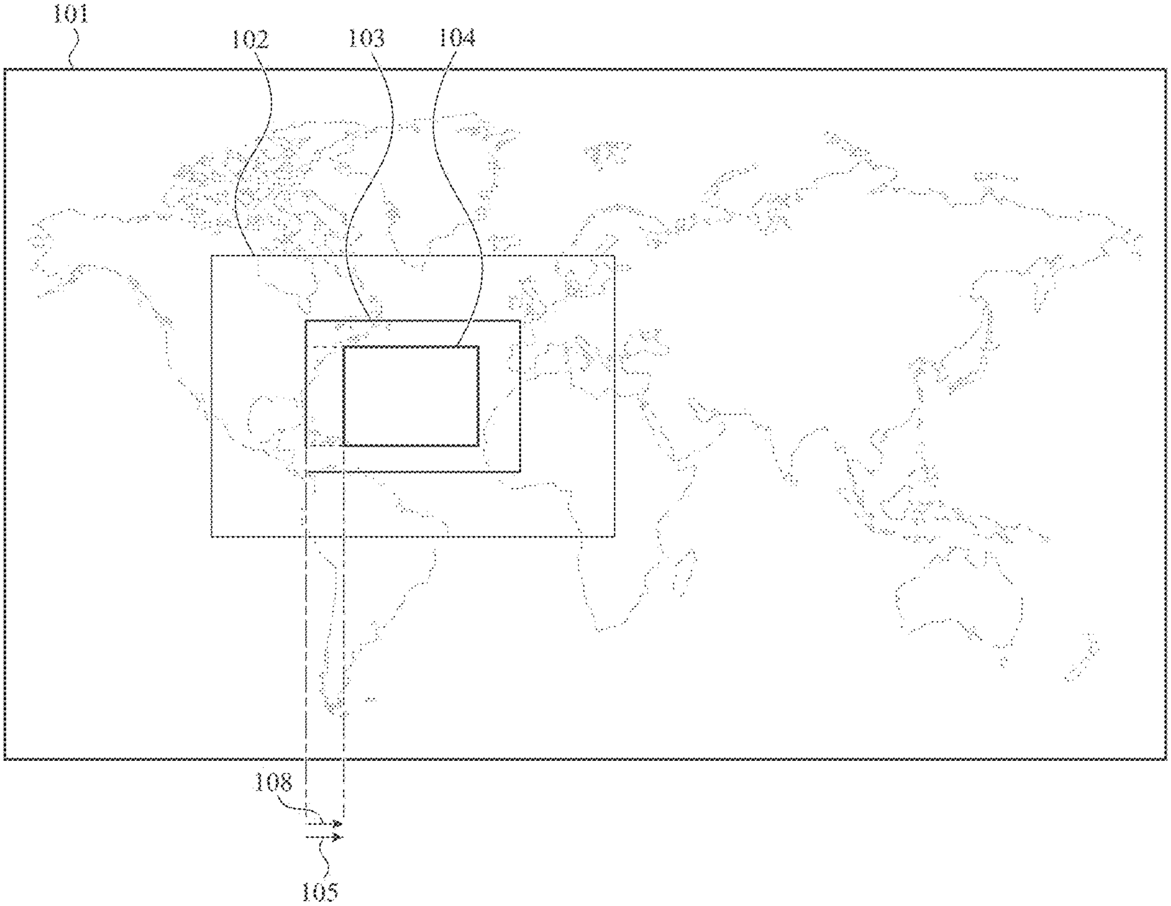
FIG. 2C illustrates third movement of the content and the viewing area of FIG. 2B according to the first different motion criteria.

FIG. 2C illustrates third movement of the content 101 and the viewing area 104 of FIG. 2B according to the first different motion criteria. According to the first different motion criteria, as the user slows their head, the viewing area 104 may move with respect to the field of view 102 (the movement 108) to return to the initial position, such as center.

The first different motion criteria may be configured according to a number of options. In some examples, the content 101 may maintain a body-locked position, resulting in panning of being faster than head motion. In other examples, the content 101 may shift position such that there is no panning as the viewing area 104 returns to center. In still other examples, the content 101 may shift position such that panning matches or is slower than head motion. Various configurations are possible and contemplated without departing from the scope of the present disclosure.

Figure 3B:
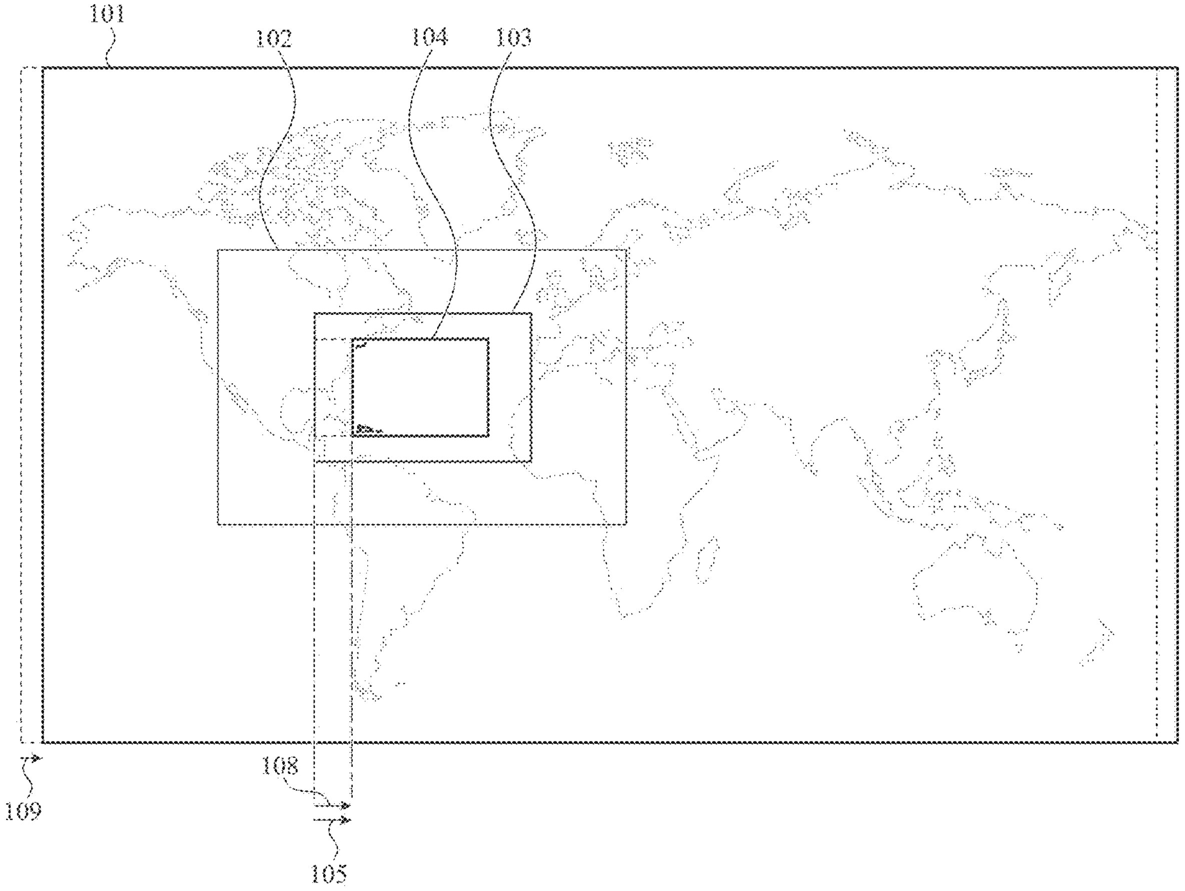
FIG. 3B illustrates second movement of the content and the viewing area of FIG. 3A according to the second different motion criteria.

FIGS. 3A-3B may illustrate partially head-locked translation and/or reduced panning speed. Lag value may also be calculated for the content 101, but may use a different relationship with the determined motion. For example, slow device motion may cause the lag value to trend toward body-locked motion, whereas faster device motion may cause the lag value to trend toward a head-locked motion. How the partial head-locking of the content 101 may also depend on the type of content. For example, in the live preview context, it may be desirable for the content 101 to more strongly head-locked (so that the portion of the image shown in the viewing area 104 more accurately aligns with the surrounding environment). Conversely, when traversing a menu, photo wall, or the like, it may be desirably to be less strongly head-locked (e.g., closer to body-locked). For example, FIG. 3A illustrates first movement of the content 101 and the viewing area 104 of FIG. 1 according to second different motion criteria. According to the second different motion criteria, the content 101 is partially head-locked (less than the user head motion) such that the content 101 partially shifts by the movement 109 with respect to the extended reality environment responsive to the user head motion to account for the new-body-locked position. The content 101 may also shift by the movement 107 with respect to the field of view 102. Also according to the second different motion criteria, the movement 105 of the viewing area 104 and/or the movement 106 of the field of view 102 with respect to the extended reality environment may track the user head motion. This may result in panning being slower than head motion and also slower than the example illustrated in FIGS. 2A-2B.

FIG. 3B illustrates second movement of the content 101 and the viewing area 104 of FIG. 3A according to the second different motion criteria. As shown, according to the second different motion criteria, the movement 105 of viewing area 104 relative to the field of view 102 may return to center as the user slows their head. Thus, FIGS. 3A-3B show application of first motion criteria of the second different motion criteria to shift viewing area 104 a first amount with respect to the field of view 102 and second motion criteria of the second different motion criteria to shift the content 101 a second amount with respect to the field of view 102.

The second different motion criteria may be also configured according to a number of options. In some examples, the content 101 may be body-locked as head motion slows. In such examples, panning speed may be determined by the viewing area 104 lag. In other examples, the head-locking amount may be maintained or slowed. In still other examples, the content 101 may be at least partially head-locked to reduce panning speed. One or more of these options may result in panning being faster than head motion.

In various examples, the movement 105 of the viewing area 104 with respect to the field of view 102 and/or the movement 107 of the content 101 with respect to the field of view 102 may continue after head motion has ceased. Depending on the amount of head-locking of the content 101, the viewing area 104 may end up returning to an initial position within the content 101. Various configurations are possible and contemplated without departing from the scope of the present disclosure.

Figure 4A:
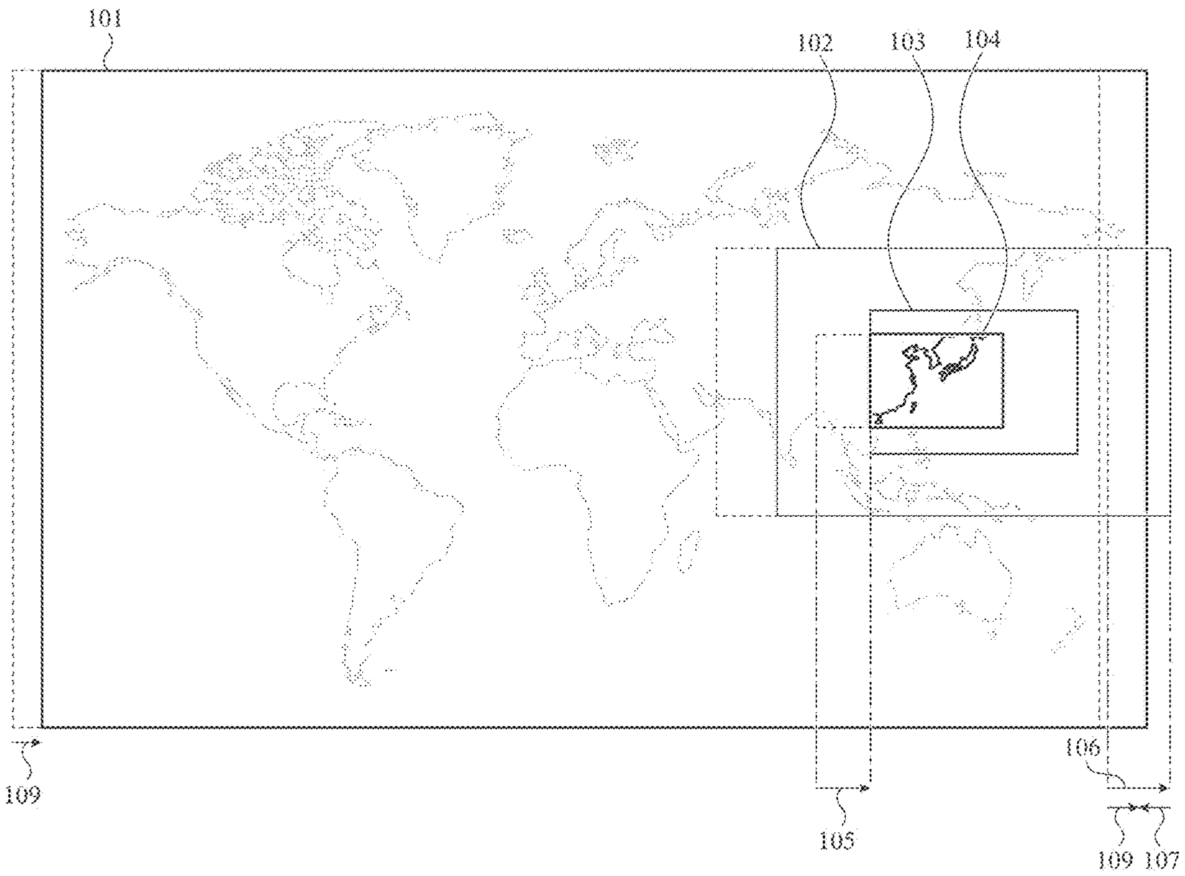
FIG. 4A illustrates first movement of the content and the viewing area of FIG. 1 according to third different motion criteria.
Figure 4B:
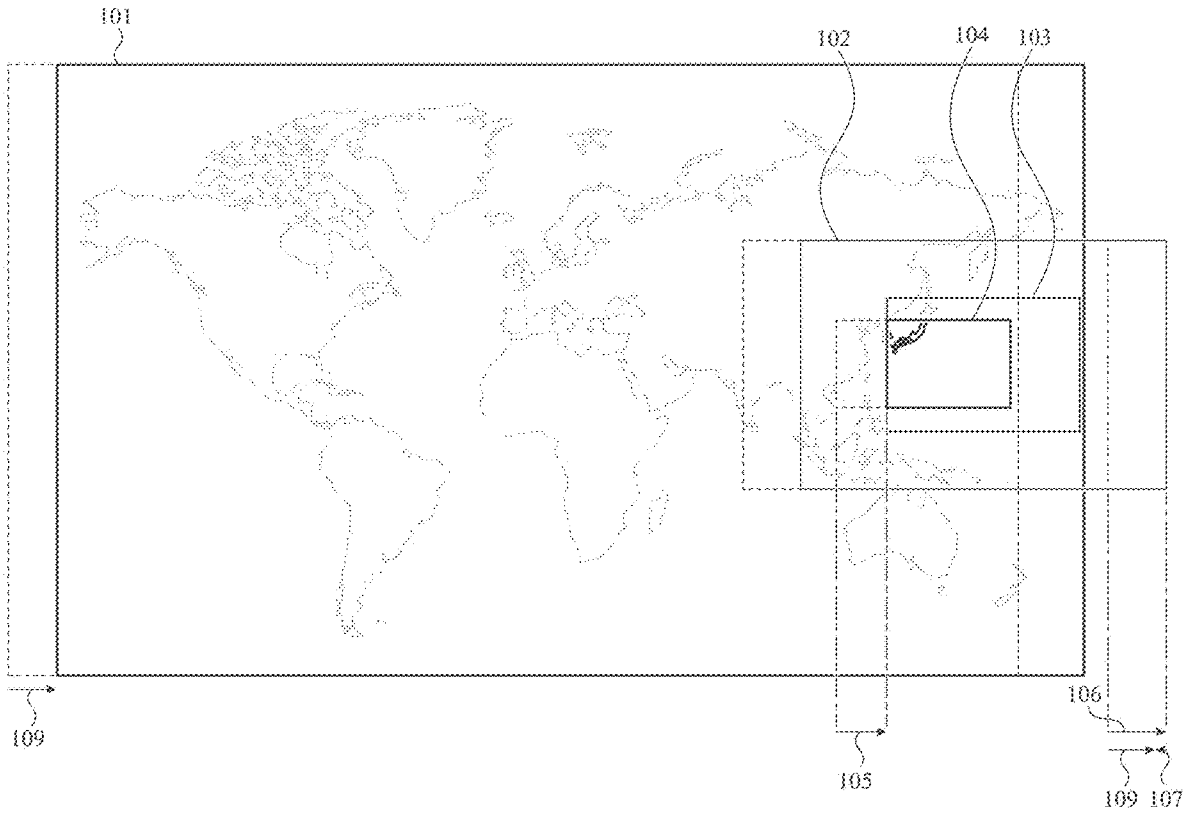
FIG. 4B illustrates second movement of the content and the viewing area of FIG. 4A according to the third different motion criteria.

FIGS. 4A-4B may illustrate partially head-locked translation and/or boundary acceleration. FIG. 4A illustrates first movement of the content 101 and the viewing area 104 of FIG. 1 according to third different motion criteria. According to the third different motion criteria, the movement 109 of the content 101 with respect to the extended reality environment may be partially head-locked (less than head motion) to shift responsive to the user head motion partially to account for the new head-locked position while the viewing area 104 may track head motion. The content 101 may also shift by the movement 107 with respect to the field of view 102. The result may be panning that is slower than head motion, which may be the same as the example illustrated in FIGS. 3A-3B. The movement 105 of the viewing area 104 with respect to the extended reality environment and/or the movement 106 of the field of view 102 with respect to the extended reality environment may be similar to that shown in FIG. 3A.

FIG. 4B illustrates second movement of the content 101 and the viewing area 104 of FIG. 4A according to the third different motion criteria. According to the third different motion criteria, the panning may decrease as the edge of the content 101 approaches as the viewing area 104, which may be locked to the edge of the content 101. Thus, FIGS. 4A-4B show application of first motion criteria of the third different motion criteria to shift viewing area 104 moving a first amount with respect to the field of view 102 and second motion criteria of the third different motion criteria to shift the content 101 a second amount with respect to the field of view 102. Various configurations are possible and contemplated without departing from the scope of the present disclosure.

Figure 5:
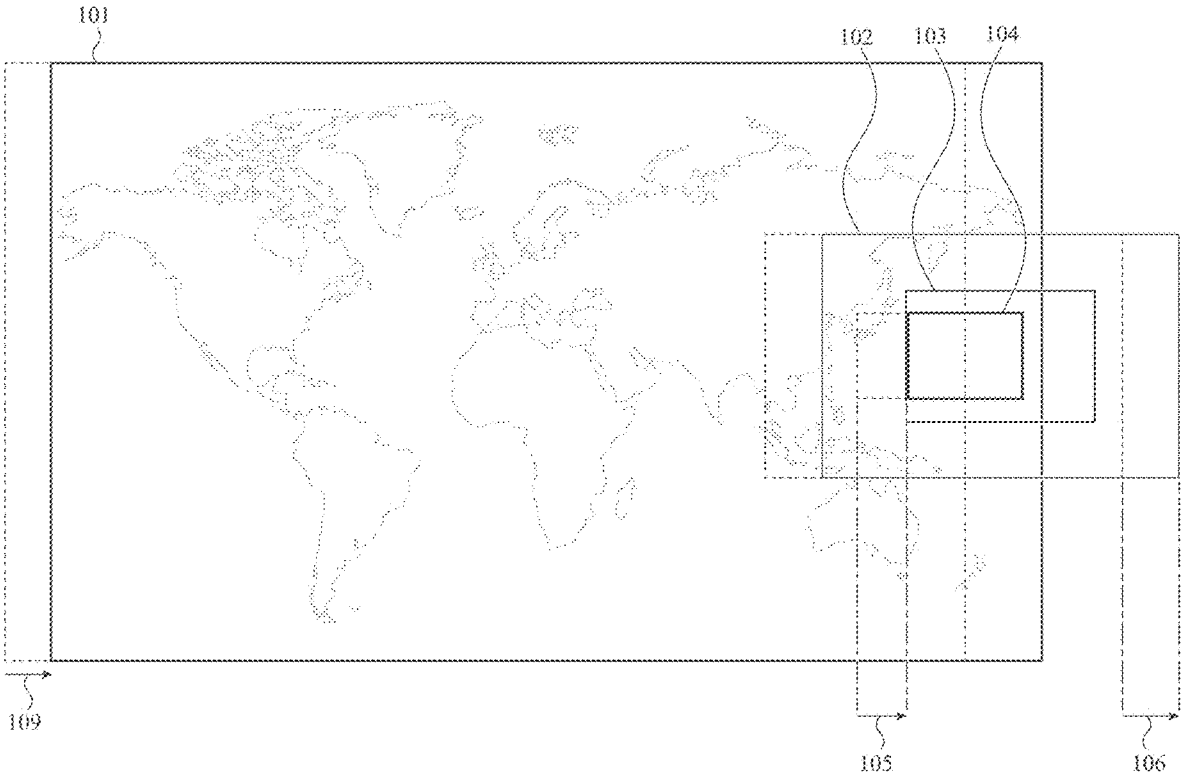
FIG. 5 illustrates movement of the content and the viewing area of FIG. 1 according to fourth different motion criteria.

FIG. 5 may illustrate partial head-locked translation and/or boundary acceleration. FIG. 5 illustrates movement of the content 101 and the viewing area 104 of FIG. 1 according to fourth different motion criteria. According to the fourth different motion criteria, the movement 109 of the content 101 with respect to the extended reality environment may be fully head-locked and the viewing area 104 may be locked to the boundary at the edge of the content 101 such that there is no panning with the user head motion. Prior to the boundary, the movement 105 of the viewing area 104 with respect to the extended reality environment and/or the movement 106 of the field of view 102 with respect to the extended reality environment may be similar to that shown in FIG. 3A. Thus, FIG. 5 shows application of first motion criteria of the fourth different motion criteria to shift viewing area 104 a first amount with respect to the field of view 102 and second motion criteria of the fourth different motion criteria to shift the content 101 a second amount with respect to the extended reality environment. Various configurations are possible and contemplated without departing from the scope of the present disclosure.

Figure 6:
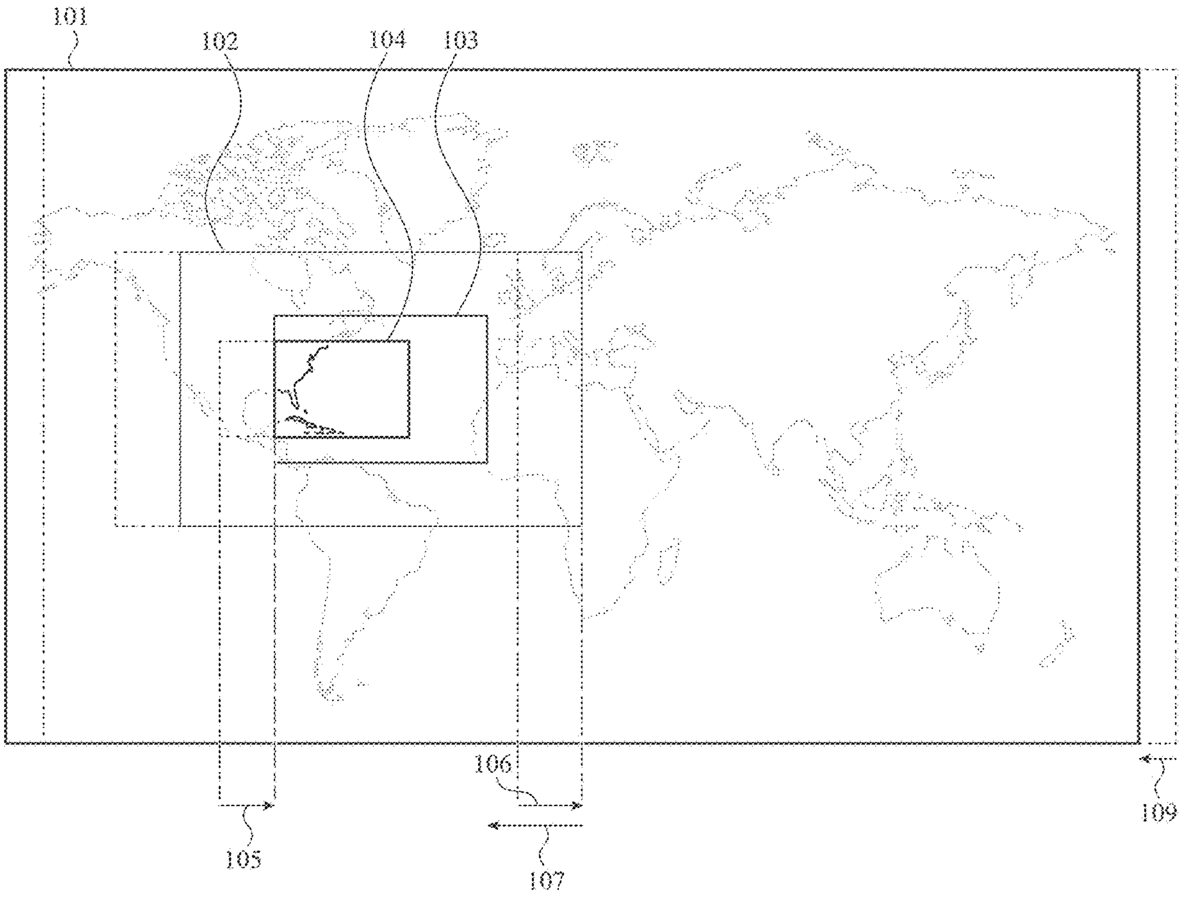
FIG. 6 illustrates movement of the content and the viewing area of FIG. 1 according to fifth different motion criteria.

FIG. 6 may illustrate reverse head-locked translation and/or increased panning speed. FIG. 6 illustrates movement of the content 101 and the viewing area 104 of FIG. 1 according to fifth different motion criteria. According to the fifth different motion criteria, the viewing area 104 may track the user head motion while the movement 107 of the content 101 with respect to the field of view 102 shifts to account for the new body-locked position. The movement 105 of the viewing area 104 with respect to the extended reality environment and/or the movement 106 of the field of view 102 with respect to the extended reality environment may be similar to that shown in FIG. 3A. However, unlike the examples shown in FIGS. 3A-5, the content 101 may be reverse-head-locked such that the movement 107 of the content 101 with respect to the field of view 102 and the movement 109 of the content 101 with respect to the extended reality environment is away from the user head motion. This may result in panning that is slower than the user head motion. Thus, FIG. 6 shows application of first motion criteria of the fifth different motion criteria to shift viewing area 104 a first amount with respect to the field of view 102 and second motion criteria of the fifth different motion criteria to shift the content 101 a second amount with respect to the field of view 102. Various configurations are possible and contemplated without departing from the scope of the present disclosure.

Figure 7:
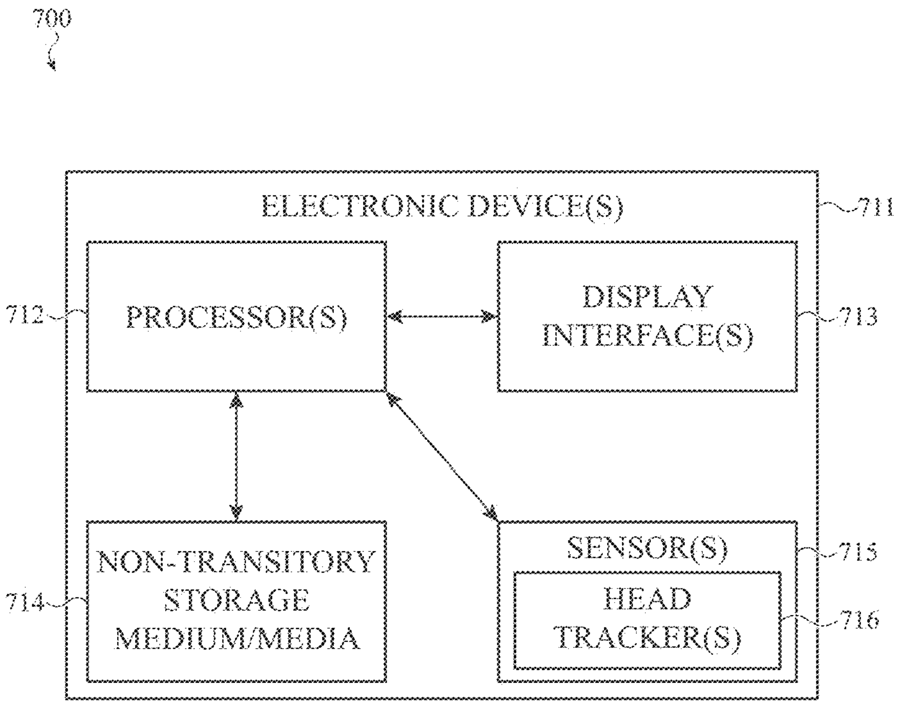
FIG. 7 is a block diagram illustrating example relationships between example components of an electronic device, such as a head-mounted display device that may be configured as described with respect to FIGS. 1-6.

FIG. 7 is a block diagram 700 illustrating example relationships between example components of an electronic device 711, such as a head-mounted display device that may be configured as described with respect to FIGS. 1-6.

The electronic device 711 may include one or more processors 712 and/or other controllers and/or processing units, one or more display interfaces 713 (such as one or more display controllers for one or more display devices that may be incorporated into the electronic device 711 and/or communicably coupled to the electronic device 711), one or more sensors 715, and one or more non-transitory storage media 714 (which may take the form of, but is not limited to, a magnetic storage medium; optical storage medium; magneto-optical storage medium; read only memory; random access memory; erasable programmable memory; flash memory; and so on).

The display interface 713 may be one or more display controllers for one or more display devices that may be incorporated into the electronic device 711. Alternatively and/or additionally, the one or more display devices may be communicably coupled to the electronic device 711. Various configurations are possible and contemplated without departing from the scope of the present disclosure.

The one or more sensors 715 may include one or more head trackers 716 (such as one or more cameras, inertial sensors, and/or other movement sensors) that may be used to determine a determined head motion (i.e., track movement of a user's head). Alternatively and/or additionally, the one or more sensors 715 may include one or more body trackers. Various configurations are possible and contemplated without departing from the scope of the present disclosure.

Figure 8:
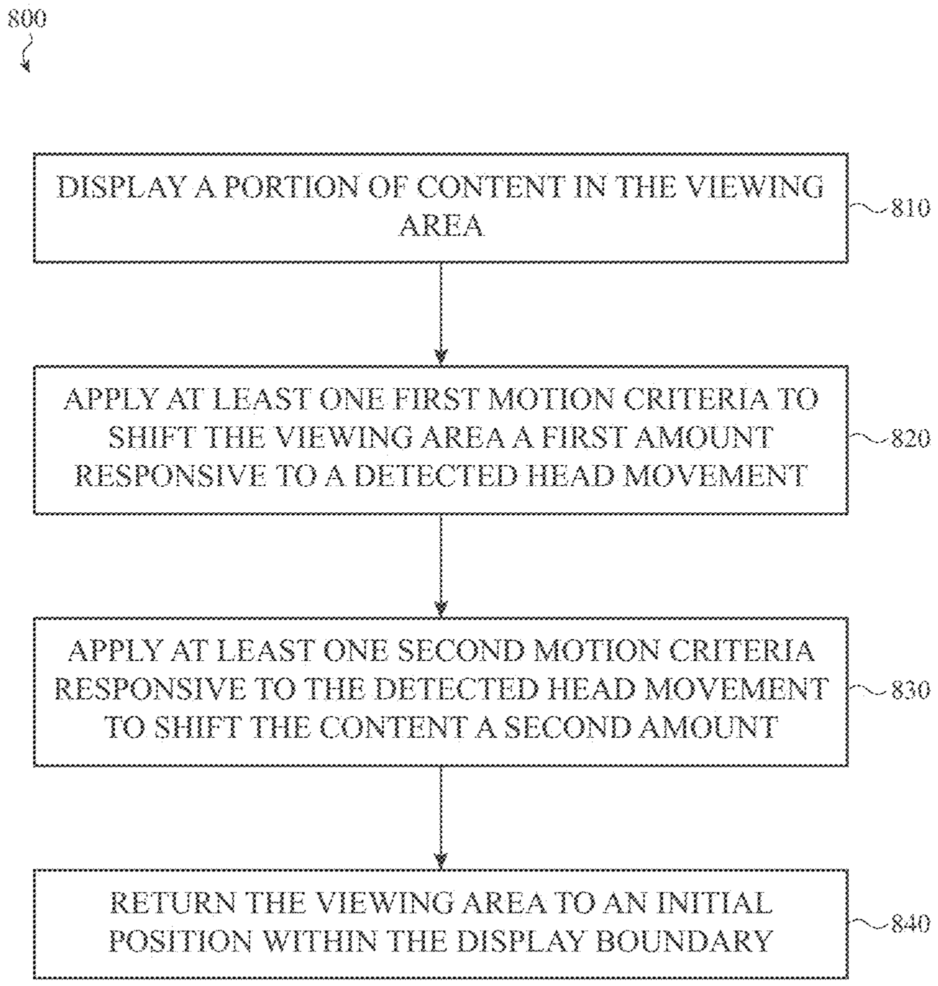
FIG. 8 is a flow chart illustrating a first example method for using multilayer handling techniques for head-mounted display devices. This method may be performed by the electronic device of FIG. 7.

FIG. 8 is a flow chart illustrating a first example method 800 for using multilayer handling techniques for head-mounted display devices. This method 800 may be performed by the electronic device of FIG. 7.

At operation 810, an electronic device (such as a head-mounted display device and/or the electronic device 711 of FIG. 1) may display a portion of content in a viewing area The viewing area may be the viewing area of a head-mounted display device having a field of view and a display boundary within the field of view. The viewing area may be defined within the display boundary. The display boundary may be a physical boundary of a display of the head-mounted display device as described previously. The viewing area, the display boundary, the content, or the field of view may be at least partially transparent. The content may be any kind of content, such as a map, a menu or other user interface, a photo wall, and so on.

At operation 820, the electronic device may apply at least one first motion criteria to shift or otherwise move the viewing area a first amount responsive to a detected head movement. The first amount may be a number of pixels. The first amount may be with respect to the field of view and/or an extended reality environment associated with the head-mounted display device.

The viewing area may be moved the first amount at a particular rate. The particular rate may change. For example, the rate may be slower than a detected head speed during a first time period prior to the viewing area reaching the display boundary and equal to the detected head speed during a second time period upon the viewing area reaching the display boundary.

At operation 830, the electronic device may apply at least one second motion criteria responsive to the detected head movement to shift the content a second amount. The second amount may be different from the first amount. The second amount may be proportional to an amount of the detected head movement. The second amount may be proportionally less than or greater than an amount of the detected head movement. The second amount may include a first portion that the content shifts prior to slowing of the detected head movement and a second portion that the content shifts upon slowing of the head movement. The first and second portions may be unequal. The second portion may proportionally equal a corresponding portion of the detected head movement. The second amount may be with respect to the field of view and/or the extended reality environment.

In various examples, the electronic device may slow and/or cease shifting of the content as the viewing area approaches a content boundary during an additional time period. In some examples, shifting of the viewing area and/or of the content may continue after cessation of the detected head movement.

At operation 840, the electronic device may return the viewing area to an initial position within the display boundary. The initial position may be centered vertically and/or horizontally within the display boundary.

In some examples, the electronic device may return the content to an original position within the viewing area. Various configurations are possible and contemplated without departing from the scope of the present disclosure.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as shifting the viewing area and the content different amounts. However, it is understood that this is an example. In some implementations, the at least one first and second motion criteria may be applied to shift the viewing area and the content the same amount. Various configurations are possible and contemplated without departing from the scope of the present disclosure.

Figure 9:
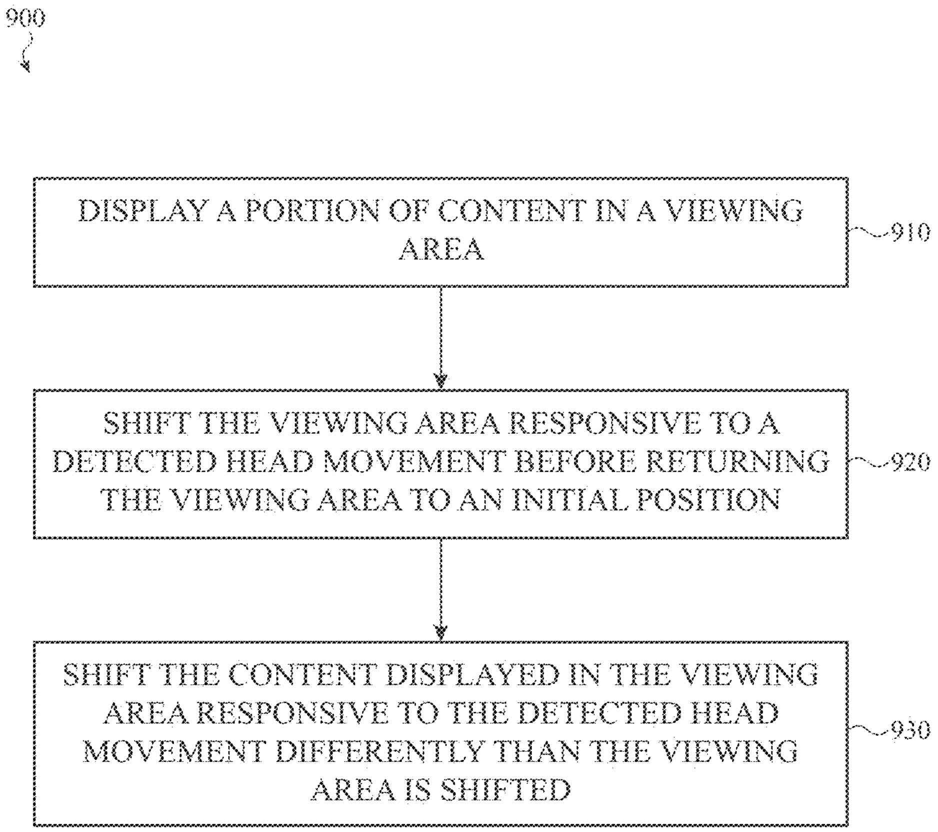
FIG. 9 is a flow chart illustrating a second example method for using multilayer handling techniques for head-mounted display devices. This method may be performed by the electronic device of FIG. 7.

FIG. 9 is a flow chart illustrating a second example method 900 for using multilayer handling techniques for head-mounted display devices. This method 900 may be performed by the electronic device 711 of FIG. 7.

At operation 910, an electronic device (such as a head-mounted display device and/or the electronic device 711 of FIG. 1) may display a portion of content in a viewing area. The viewing area may be defined within a display boundary in a field of view of a head-mounted display device. The content may be any kind of content, such as a map, a menu or other user interface, a photo wall, and so on.

At operation 920, the electronic device may shift the viewing area responsive to a detected head movement before returning the viewing area to an initial position. The initial position may be within the display boundary. The electronic device may shift the viewing area with respect to the field of view. Alternatively, the electronic device may shift the viewing area with respect to an extended reality environment associated with display of the portion of content.

At operation 930, the electronic device may shift the content displayed in the viewing area responsive to the detected head movement differently than the viewing area is shifted. The electronic device may shift the content displayed in the viewing area responsive to the detected head movement differently than the viewing area is shifted by applying at least one first motion criteria to the viewing area and at least one second motion criteria to the content. The electronic device may shift the content with respect to the field of view. Alternatively, the electronic device may shift the content with respect to an extended reality environment associated with display of the portion of content.

In some examples, the viewing area and/or the content may be shifted in a direction opposite the detected head movement. In various examples, viewing area and/or the content may be shifted in same direction as the detected head movement.

Although the example method 900 is illustrated and described as including particular operations performed in a particular order, it is understood that this is an example. In various implementations, various orders of the same, similar, and/or different operations may be performed without departing from the scope of the present disclosure.

For example, in some implementations, the method 900 may include the additional operation of returning the viewing area to an original position within the display boundary. This additional operation may be performed upon slowing of the detected head movement. Various configurations are possible and contemplated without departing from the scope of the present disclosure.

Figure 10:
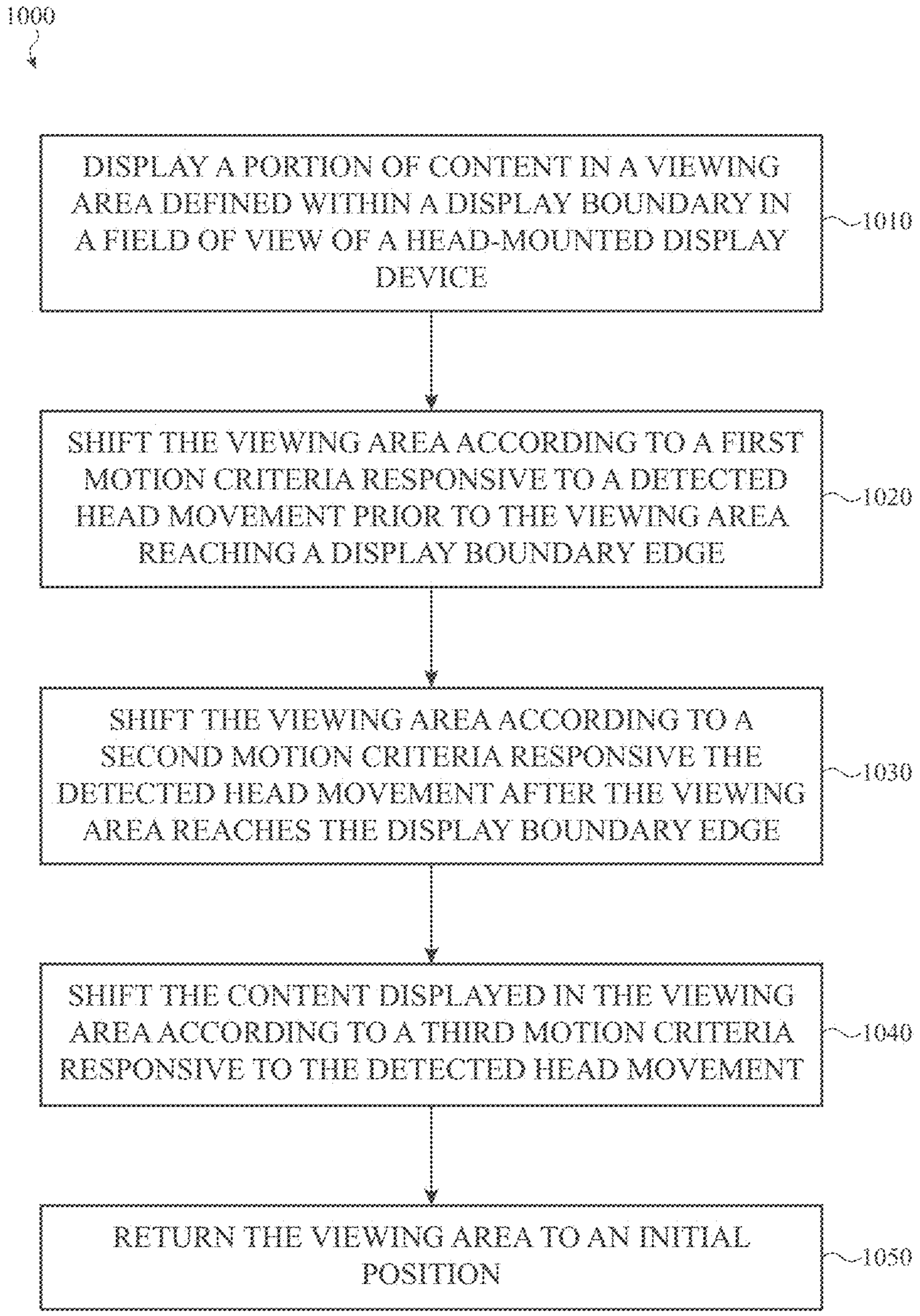
FIG. 10 is a flow chart illustrating a third example method for using multilayer handling techniques for head-mounted display devices. This method may be performed by the electronic device of FIG. 7.

FIG. 10 is a flow chart illustrating a third example method 1000 for using multilayer handling techniques for head-mounted display devices. This method 1000 may be performed by the electronic device 711 of FIG. 7.

At operation 1010, an electronic device (such as a head-mounted display device and/or the electronic device 711 of FIG. 1) may display a portion of content in a viewing area defined within a display boundary in a field of view of a head-mounted display device. The content may be any kind of content, such as a map, a menu or other user interface, a photo wall, and so on.

At operation 1020, the electronic device may shift the viewing area with respect to the field of view according to a first motion criteria responsive to a detected head movement during a first time period prior to the viewing area reaching a display boundary edge. At operation 1030, the electronic device may shift the viewing area with respect to an extended reality environment associated with the content according to a second motion criteria responsive the detected head movement during a second time period after the viewing area reaches the display boundary edge. In some examples, the first motion criteria may be applied to shift the viewing area an amount at a slower rate than the second motion criteria.

At operation 1040, the electronic device may shift the content displayed in the viewing area with respect to the field of view according to a third motion criteria responsive to the detected head movement. The content may be shifted in a direction opposite the detected head movement or in the same direction as the detected head movement.

At operation 1050, the electronic device may return the viewing area to an initial position. The initial position may be within the display area, such as centered within the display area. The viewing area may pay as the viewing area returns to the initial position. Panning of the viewing area may be at a different speed than that of the detected head movement. In some examples, the content may shift instead of the viewing area panning as the viewing area returns to the initial position.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as being performed by an electronic device. However, it is understood that this is an example. In various implementations, multiple electronic devices may cooperate to perform the method 1000. Various configurations are possible and contemplated without departing from the scope of the present disclosure.

In various implementations, a system may include a head-mounted display device having a field of view, a display boundary within the field of view, and a viewing area defined within the display boundary; at least one non-transitory storage medium that stores instructions; and at least one processor. The at least one processor may execute the instructions to display a portion of content in the viewing area, apply at least one first motion criteria to shift the viewing area a first amount with respect to the field of view responsive to a detected head movement, apply at least one second motion criteria responsive to the detected head movement to shift the content a second amount with respect to the field of view different from the first amount, and return the viewing area to an initial position within the display boundary.

In some examples viewing area may shift with respect to the field of view during a first time period and with respect to an extended reality environment associated with the head-mounted display device during a second time period. In a number of examples, the second amount may be proportional to an amount of the detected head movement.

In various examples, the second amount is at least one of proportionally less than an amount of the detected head movement or proportionally greater than the amount of the detected head movement. In some such examples, the second amount includes a first portion that the content shifts prior to slowing of the detected head movement and a second portion that the content shifts upon slowing of the head movement and the first portion and the second portion are unequal. In a number of such examples the second portion proportionally equals a corresponding portion of the detected head movement. In some such examples, the at least one processor further executes the instructions to return the content to an original position within the viewing area.

In a number of examples, the at least one processor may further execute the instructions to at least one of slow shifting of the content as the viewing area approaches a content boundary or cease the shifting of the content upon the viewing area reaching the content boundary. In some examples, at least one of shifting of the viewing area or shifting of the content may continue after cessation of the detected head movement. In a number of examples, the initial position of the viewing area may be centered within the display boundary.

In various examples, the display boundary may be a display boundary of the head-mounted display device. In some examples, at least one of the viewing area, the display boundary, the content, or the field of view may be at least partially transparent.

In some implementations, a system may include at least one non-transitory storage medium that stores instructions and at least one processor. The at least one processor may execute the instructions to display a portion of content in a viewing area defined within a display boundary in a field of view of a head-mounted display device, shift the viewing area with respect to the field of view responsive to a detected head movement before returning the viewing area to an initial position within the display boundary, and shift the content displayed in the viewing area with respect to the field of view responsive to the detected head movement differently than the viewing area is shifted.

In various examples, the at least one processor may further execute the instructions to return the viewing area to an original position within the display boundary upon slowing of the detected head movement. In a number of examples, the at least one processor may execute the instructions to shift at least one of the viewing area of the content in a direction opposite the detected head movement. In some examples, the content may be a menu.

In a number of implementations, a system may include at least one non-transitory storage medium that stores instructions and at least one processor. The at least one processor may execute the instructions to display a portion of content in a viewing area defined within a display boundary in a field of view of a head-mounted display device, shift the viewing area with respect to the field of view according to a first motion criteria responsive to a detected head movement during a first time period prior to the viewing area reaching a display boundary edge, shift the viewing area with respect to an extended reality environment associated with the content according to a second motion criteria responsive the detected head movement during a second time period after the viewing area reaches the display boundary edge, shift the content displayed in the viewing area with respect to the field of view according to a third motion criteria responsive to the detected head movement, and return the viewing area to an initial position within the display boundary.

In various examples, the at least one processor may further execute the instructions to pan the viewing area as the viewing area returns to the initial position. In some such examples, panning of the viewing area may be at a different speed than that of the detected head movement.

In a number of examples, the content may shift instead of the viewing area panning as the viewing area returns to the initial position.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to multilayer handling techniques for head-mounted display devices. The disclosed multilayer handling techniques may smooth motion of a viewing area that results from head movement, restrict the viewing area to define a display boundary, and variously apply different motion criteria to the content and the viewing area of the head-mounted display devices, shifting the content and the viewing area of the head-mounted display devices differently. This may cause the content presentation to appear less shaky than if the content were fully head-locked, resulting in a more pleasant and usable viewing experience.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, which may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
- a head-mounted display device having a field of view, a display boundary within the field of view, and a viewing area defined within the display boundary;
- at least one non-transitory storage medium that stores instructions; and
- at least one processor that executes the instructions to:
  - display a portion of content in the viewing area, the viewing area positioned at an initial position within the display boundary;
  - apply at least one first motion criteria to shift the viewing area a first amount with respect to the field of view responsive to a detected head movement;
  - apply at least one second motion criteria responsive to the detected head movement to shift the content a second amount with respect to the field of view different from the first amount; and
  - return the viewing area to the initial position within the display boundary.

2. The system of claim 1, wherein the viewing area shifts:
- with respect to the field of view during a first time period; and
- with respect to an extended reality environment associated with the head-mounted display device during a second time period.

3. The system of claim 1, wherein the second amount is proportional to an amount of the detected head movement.

4. The system of claim 1, wherein the second amount is at least one of:
- proportionally less than an amount of the detected head movement; or
- proportionally greater than the amount of the detected head movement.

5. The system of claim 4, wherein:
- the second amount includes a first portion that the content shifts prior to slowing of the detected head movement and a second portion that the content shifts upon slowing of the head movement; and
- the first portion and the second portion are unequal.

6. The system of claim 5, wherein the second portion proportionally equals a corresponding portion of the detected head movement.

7. The system of claim 5, wherein the at least one processor further executes the instructions to return the content to an original position within the viewing area.

8. The system of claim 1, wherein the at least one processor further executes the instructions to at least one of:
- slow shifting of the content as the viewing area approaches a content boundary; or
- cease the shifting of the content upon the viewing area reaching the content boundary.

9. The system of claim 1, wherein at least one of shifting of the viewing area or shifting of the content continues after cessation of the detected head movement.

10. The system of claim 1, wherein the initial position of the viewing area is centered within the display boundary.

11. The system of claim 1, wherein the display boundary is a physical boundary of a display of the head-mounted display device.

12. The system of claim 1, wherein at least one of the viewing area, the display boundary, the content, or the field of view are at least partially transparent.

13. A system, comprising:
- at least one non-transitory storage medium that stores instructions; and
- at least one processor that executes the instructions to:
  - display a portion of content in a viewing area defined within a display boundary in a field of view of a head-mounted display device, the viewing area positioned at an initial position within the display boundary;
  - shift the viewing area with respect to the field of view responsive to a detected head movement before returning the viewing area to the initial position within the display boundary; and
  - shift the content displayed in the viewing area with respect to the field of view responsive to the detected head movement differently than the viewing area is shifted.

14. The system of claim 13, wherein the at least one processor further executes the instructions to return the viewing area to an original position within the display boundary upon slowing of the detected head movement.

15. The system of claim 13, wherein the at least one processor executes the instructions to shift at least one of the viewing area of the content in a direction opposite the detected head movement.

16. The system of claim 13, wherein the content comprises a menu.

17. A system, comprising:
- at least one non-transitory storage medium that stores instructions; and
- at least one processor that executes the instructions to:
  - display a portion of content in a viewing area defined within a display boundary in a field of view of a head-mounted display device, the viewing area positioned at an initial position within the display boundary;
  - shift the viewing area with respect to the field of view according to a first motion criteria responsive to a detected head movement during a first time period prior to the viewing area reaching a display boundary edge;
  - shift the viewing area with respect to an extended reality environment associated with the content according to a second motion criteria responsive the detected head movement during a second time period after the viewing area reaches the display boundary edge;

shift the content displayed in the viewing area with respect to the field of view according to a third motion criteria responsive to the detected head movement; and return the viewing area to the initial position within the display boundary.

18. The system of claim 17, wherein the at least one processor further executes the instructions to pan the viewing area as the viewing area returns to the initial position.

19. The system of claim 18, wherein panning of the viewing area is at a different speed than that of the detected head movement.

20. The system of claim 17, wherein the content shifts instead of the viewing area panning as the viewing area returns to the initial position.

* * * * *